United States Patent [19]

Coburn, Jr.

[11] Patent Number: 4,813,690
[45] Date of Patent: Mar. 21, 1989

[54] SEALING MEMBER

[75] Inventor: John A. Coburn, Jr., Warren, Mich.

[73] Assignee: L & L Products, Inc., Romeo, Mich.

[21] Appl. No.: 124,906

[22] Filed: Nov. 24, 1987

[51] Int. Cl.⁴ .............................................. F16J 15/06
[52] U.S. Cl. .................................................... 277/205
[58] Field of Search ........................... 277/205, 207 R

[56] References Cited

U.S. PATENT DOCUMENTS

| | | | |
|---|---|---|---|
| 2,705,655 | 4/1955 | Brown et al. | 277/207 X |
| 2,744,847 | 5/1956 | Orr | 277/207 X |
| 3,915,463 | 10/1975 | Pippert | 277/205 |
| 3,921,991 | 11/1975 | Beck | 277/205 |

FOREIGN PATENT DOCUMENTS

| | | | |
|---|---|---|---|
| 69569 | 7/1958 | France | 277/207 R |
| 1186929 | 3/1959 | France | 277/205 |

OTHER PUBLICATIONS

"Photographs P-1 through P-5 of a prior art intermediate fuel filler opening assembly".

Primary Examiner—Donald A. Griffin
Attorney, Agent, or Firm—Harness, Dickey & Pierce

[57] ABSTRACT

An elongated elastomeric sealing member is disclosed for sealing between a pair of adjacent spaced-apart panels. The preferred sealing member includes an elongated inner bead portion and one or more elongated flange portions extending generally laterally outwardly from the bead portion. The flange portions are preferably disposed at a lateral angular relationship of less than 180 degrees with respect to one another and have outer ends or edges resiliently engageable with the spaced-apart panels. The bead portion preferably includes a generally convex arcuate inner surface and a pair of generally flat outer surfaces, with the flat outer surfaces being disposed on opposite lateral sides of the arcuate inner surface, between the arcuate inner surface and the flange portions.

31 Claims, 3 Drawing Sheets

SEALING MEMBER

BACKGROUND OF THE INVENTION

The invention relates generally to elastomeric sealing members for sealing between two adjacent but spaced-apart objects, such as vehicle body panels for example. More specifically, the invention has particularly advantageous application in sealing members composed of a heat-activated expandable foam material, wherein the sealing member is positioned in place between the two spaced-apart objects and then heated in order to activate the expansion of the foam material.

Various types and configurations of sealing members have previously been devised for providing a fluid-tight seal between an outer vehicle body panel and an inner vehicle body panel, commonly referred to as a "wheel house", in the area surrounding the fuel filler opening for a vehicle. Such sealing members have been provided for purposes of constraining any spilled fuel during a refueling operation to the typically recessed fuel filler compartment generally surrounding the inlet to the fuel filler neck piping.

In the example discussed above, such previous seals have been required to be stapled or otherwise bonded or affixed to one of the inner or outer body panels in order to maintain the sealing member in its proper position and to prevent sagging of the sealing member during various production or assembly steps. Such sealing members have also been retained in grooves or other recessed portions of one of the body panels in order to maintain their proper positioning during assembly. Frequently, however, in addition to being difficult to install and maintain in their proper positions during vehicle body assembly, such previous sealing members have not been able to accommodate variations in the spacing between the inner and outer body panels within a particular vehicle body configuration, as well as being unable to be adapted to different vehicle body configurations wherein the spacing between the inner and outer body panels is different from one vehicle configuration to the next.

Accordingly, one of the objects of the present invention is to provide a sealing member for sealing between adjacent spaced-apart objects, such as inner and outer vehicle body panels, wherein the ease of installation and positioning of the sealing member during assembly is greatly facilitated. In addition, the present invention seeks to overcome some of the above-discussed disadvantages of prior art sealing members by providing a sealing member that is capable of accommodating relatively wide variations and tolerances in the spacing between the adjacent spaced-apart panels, as well as being adaptable to different vehicle configurations having differing spacing between inner and outer body panels.

According to the present invention, an elongated elastomeric sealing member is provided for sealing between a pair of adjacent, spaced-apart objects or panels, wherein the sealing member includes an elongated inner bead portion and a pair of elongated flange portions extending in generally outward lateral directions from the bead portion. Preferably, the flange portions are disposed at a laterally angular relationship of less than 180 degrees with respect to one another in lateral cross-section, with their respective outer ends or edges being engageable with the spaced-apart panels in order to hold the sealing member in its proper position during assembly or during subsequent operations. Such engagement of the flange portions with the two panels or other objects also tends to prevent, or at least substantially minimize sagging of the sealing member during assembly or other subsequent operations.

The bead portion includes a generally convex arcuate inner surface and a pair of generally flat outer surfaces on opposite lateral sides of the arcuate inner surface, with the flat outer surfaces being disposed between the arcuate inner surface and the flange portions. The preferred flange portions are resiliently deflectable generally toward one another in order to resiliently engage the adjacent spaced-apart panels and to thereby accommodate variations in the spacing of the spaced-apart panels. The preferred sealing member is composed of a heat-activated expandable foam material capable of expanding substantially beyond its pre-heating size, shape, and configuration in order to sealingly engage and fill a substantial portion of the space between, the adjacent panels upon application of a sufficient amount of heat to activate the expansion.

In the preferred applications of the present invention shown and described herein for purposes of illustration, the elongated elastomeric sealing member is adapted to be shaped and positioned for generally surrounding an area to be sealed, such as the fuel filler opening in a vehicle body for example. Accordingly, the sealing member according to the present invention is adapted to be bent or otherwise positioned in various curved or arcuate configurations. In order to accommodate such bending and positioning, the generally flat outer surfaces on the bead portion are disposed at an angle transverse to the flange portions and transverse to the plane along which the sealing member is bent or otherwise positioned into a curving or arcuate shape. By providing such an orientation for the generally flat outer surfaces of the bead portion, the tendency of the sealing member, with its outwardly-protruding flange portions, to buckle, wrinkle, or otherwise undesirably deform is eliminated or at least substantially reduced.

Additional objects, advantages and features of the present invention will become apparent from the following description and appended claims, taken in conjunction with the accompanying drawings.

DETAILED DESCRIPTION OF THE PREFERRED EMBODIMENTS

FIGS. 1 through 14 illustrate exemplary embodiments of a sealing member according to the present invention, shown for purposes of illustration in an application for sealing between inner and outer vehicle body panels in an area surrounding a fuel filler opening in the vehicle body. On skilled in the art will readily recognize from the following discussion, taken in conjunction with the accompanying drawings and claims, that the present invention is equally applicable to sealing members having shapes or configurations differing somewhat from that of the particular exemplary sealing member shown in the drawings, and that a sealing member according to the principles of the present invention is equally applicable in other vehicular or non-vehicular applications for providing a fluid-tight seal between adjacent panels or objects.

Figures 1, 2, 3, 4:
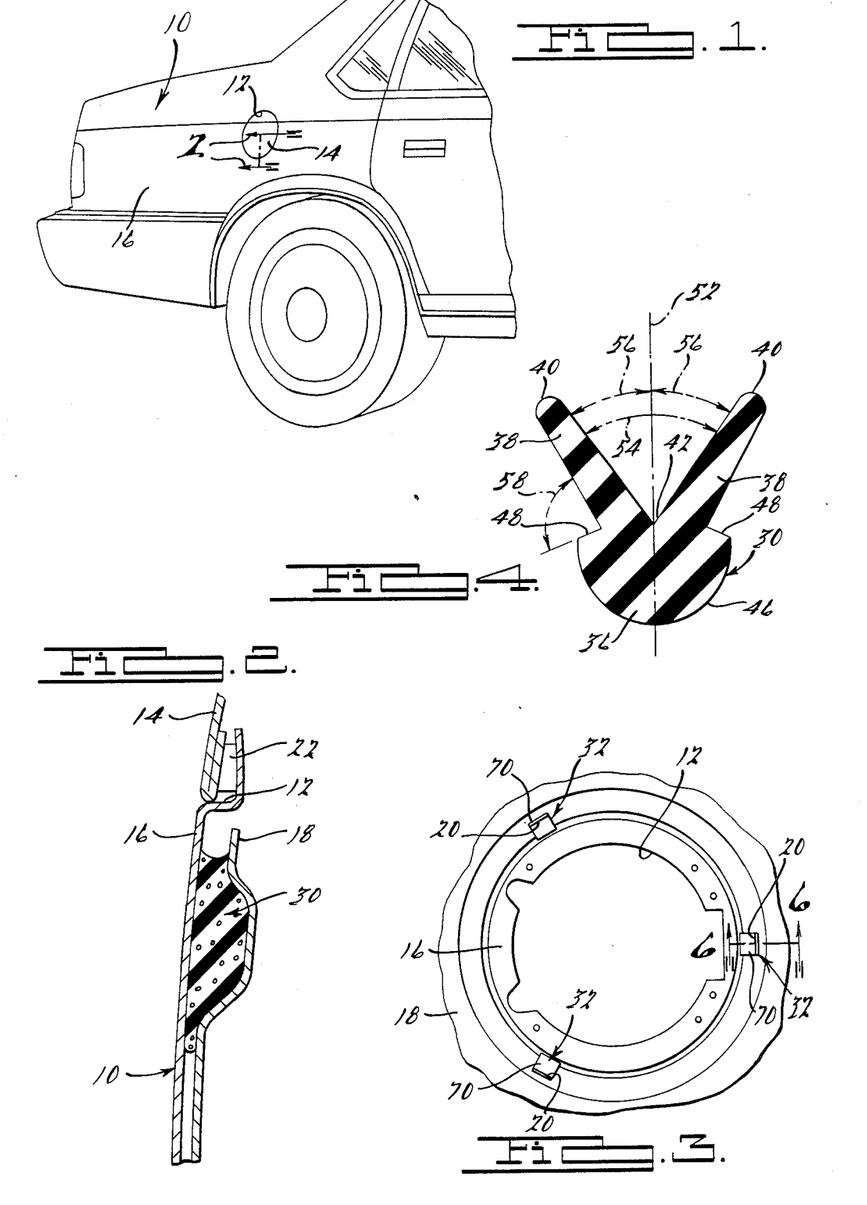
FIG. 1 is a perspective view of the rear portion of a vehicle having a hinged fuel filler door for closing off a fuel filler opening.
FIG. 2 is a cross-sectional view taken generally along line 2—2 of FIG. 1, illustrating an exemplary sealing member according to the present invention, in its final expanded configuration, for providing a fluid-tight seal between inner and outer vehicle body panels.
FIG. 3 is an elevational view of the area surrounding the fuel filler opening of the vehicle shown in FIG. 1, as viewed from the inside of the vehicle body assembly.
FIG. 4 is a lateral cross-sectional view of an exemplary sealing member according to the present invention prior to installation in the vehicle body assembly of FIG. 1.

FIGS. 1 through 3 illustrate the principles of the present invention in an exemplary application on a vehicle body 10 having a stepped fuel filler opening 12, which is formed in an outer body panel 16 and an inner body panel 18, frequently referred to as a "wheel house". Typically, a fuel filler door 14 is hingedly connected to the outer body panel 16 and pivotally movable to provide access to the fuel filler opening 12 and a fuel filler inlet (not shown). As illustrated in FIG. 2, the vehicle body 12 typically includes a stop or other bumper 22 generally adjacent the stepped fuel filler opening 12 for cushioning and engaging the hinged fuel filler door 14 when it is moved to its closed position.

As shown in FIGS. 2 and 3, a sealing member 30 according to the present invention sealingly engages the outer body panel 16 and the inner body panel 18 and fills a substantial portion of the spacing therebetween in order to constrain any spilled fuel to the fuel filler compartment adjacent the fuel filler opening 12. In one of the preferred embodiments of the present invention, which is discussed in more detail below, a number of clip members 32 are employed for temporarily retaining the sealing member 30 in its proper position during assembly or other subsequent operations, with the clip members 32 being clipped or hooked onto the inner body panel 18 through appropriately placed openings 20 therein.

As is also discussed in more detail below, the sealing member 30 according to the present invention is composed of a heat-activated expandable foam material, such as an ethyl vinyl acetate based compound, for example. After installation of the sealing member 30 in its proper position generally surrounding the stepped fuel filler opening 12, a sufficient amount of heat is applied to activate the above-mentioned expandable foam material in order to cause the sealing member 30 to expand into its final configuration shown in FIG. 2. FIG. 4, however, illustrates a lateral cross-sectional view of the sealing member 30, according to the present invention, in its pre-installed, non-heated configuration.

As shown in FIG. 4, sealing member 30 includes an inner bead portion 36 and at least a pair of resiliently deflectable outer flange portions 38 extending in a laterally outward direction from the bead portion 36, with outer ends or edges 40 of the flange portions 38 being adapted for engaging the outer body panel 16 and the inner body panel 18, or other such objects or panels for which the sealing member 30 is adapted to sealingly engage. Such engagement of the outer ends or edges 40 of the flange portions 38 tends to hold the sealing member 30 in its proper position during assembly, thereby tending to prevent sagging or other mislocation of the sealing member 30.

The innr bead portion 36 preferably includes a generally convex arcuate inner surface 46 and a pair of generally flat portions 48 on opposite lateral sides of the convex arcuate inner surface 46, with each of the flat portions 48 being disposed between the inner surface 46 and one of the flange portions 38.

Preferably, the sealing member 30, in its non-heated configuration, is generally symmetrical about a longitudinal plane, indicated by reference numeral 52 in FIG. 4, which extends outwardly through the centerline of the bead portion 36 and bisects the space between the flange portions 38. Also in the preferred configuration, the flange portions 38 are disposed at an angular relationship with respect to one another of less than 180 degrees, and most preferably at an angular relationship of approximately 80 degrees to approximately 100 degrees, as indicated by the angle 54 in FIG. 4. In addition, each of the flange portions 38 is preferably disposed at an acute angle 56 with respect to the longitudinal symmetry plane 52 shown in FIG. 4.

Figures 5, 6, 7, 8, 9, 10:
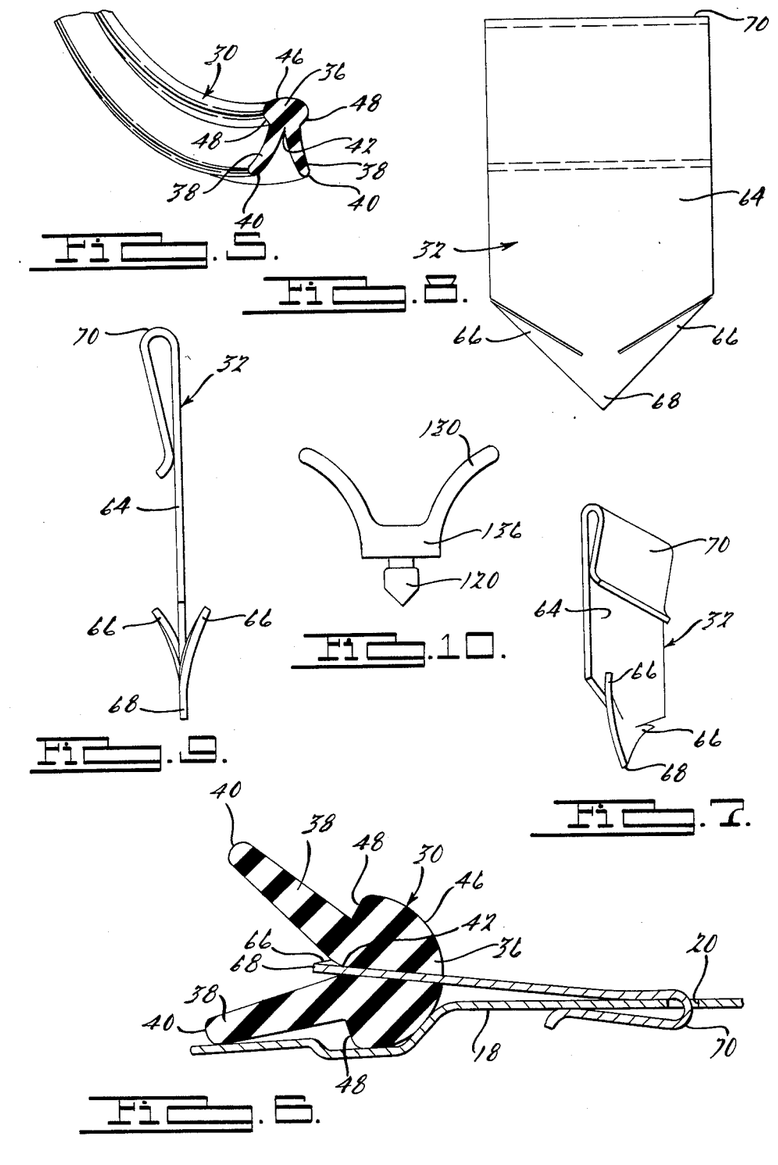
FIG. 5 is a partial perspective view of the sealing member of FIG. 4, shown bent or otherwise positioned into a curving or arcuate longitudinal path.
FIG. 6 is a cross-sectional view taken generally along lines 6—6 of FIG. 3, illustrating one application of the sealing member of FIG. 4, wherein the sealing member is temporarily held in place by a clip member adapted for engaging an inner body panel of the vehicle shown in FIG. 1.
FIG. 7 is a perspective view of the clip member of FIG. 6.
FIG. 8 is a front view of the clip member of FIG. 6.
FIG. 9 is a side view of the clip member of FIG. 6.
FIG. 10 illustrates another embodiment of the sealing member, having an alternate attachment structure.

Referring to FIGS. 4 and 5, the sealing member 30 according to the present invention is preferably adapted to be bent or otherwise configured into a generally curved or arcuate longitudinal path in order to allow the sealing member 30 to be positioned and located in a generally surrounding relationship with the fuel filler opening 12. In order to accommodate and facilitate such bending and positioning of the sealing member 30, the generally flat portions 48 are preferably disposed in a transverse relationship with respect to the symmetry plane 52 and with respect to their respective adjacent flange portions 38. By configuring the generally flat portions 48 at such an orientation, which is preferably in the range of approximately 70 degrees to approximately 110 degrees relative to the symmetry plane 52, the overall effective moment of inertia of the sealing member 30 is significantly reduced, thereby allowing for greatly enhanced ease of bending the sealing member 30 into the desired configuration, as shown diagrammatically in FIG. 5. In addition, the reduction of the moment of inertia and the consequent resistance to bending of the sealing member 30 also tends to eliminate, or at least substantially reduce, the tendency of the sealing member 30 and the flange portions 38 to buckle, wrinkle, or otherwise undesirably deform as a result of such bending. Therefore, because the general shape of the sealing member 30 prior to heating is preserved during such bending, the ability of the flange portions 38 to resiliently deflect with respect to one another in order to engage the adjacent, spaced-apart outer and inner body panel 16 and 18, respectively, is also preserved.

In certain applications of the sealing member 30 according to the present invention, it may be deemed to be necessary or desirable to temporarily retain the sealing member 30 in its proper position with respect to one of the spaced-apart panels or objects in order to preserve its proper positioning during assembly of the two panels or objects, or during subsequent operations, prior to the heat-activated expansion of the expandable foam material. Accordingly, in the exemplary application of the present invention shown in the drawings, one or more of the above-mentioned clip members 32 are affixed to the sealing member 30 and employed to temporarily attach and retain the sealing member 30 in its proper position.

As shown in FIGS. 3 and 6 through 9, a preferred clip member 32 extends in a generally lateraly outward direction through the inner bead portion 36 of the sealing member 30 and is clipped into appropriately placed openings 20 in the inner body panel 18. The exemplary clip member 32 generally includes clip body portion 64 with one or more barbs 66 on the inner barbed end 68, and a bent-over hooked end 70 opposite the barbed end 68. The clip member 32 can be composed of a spring steel or other suitable material and can be formed by stamping, followed by bending of the barbs 66 in opposite lateral directions, along with bending over the opposite end in order to form the hooked end 70 shown in FIGS. 6 through 9.

It should be noted that the clip members 32, if deemed necessary or desirable in a particular application, function only to temporarily retain the sealing member 30 in its proper position during assembly or subsequent operations. Once the sealing member 30 has been heat-activated into its expanded fianl configuration shown in FIG. 2, the clip members 32 are no longer needed to retain the sealing member 30 in its proper position, but are typically left in place in the final assembly in order to avoid any cutting or tearing of the sealing member 30, and subsequent possibility of leakage, that may result if the clip members 32 are removed after the sealing member 30 is heat activated into its final configuration.

FIG. 10 illustrates another of the preferred embodiments of the invention, wherein the sealing member 130 is substantially similar to the sealing member 30, except for the provision of a protuberance 120 on the inner bead portion 136. The protuberance 120 can be "snapped" into an appropriately located opening (not shown) in a body panel onto which the sealing member 130 is to be mounted. This eliminates the need for clips or other fasteners as described above.

Figure 11:
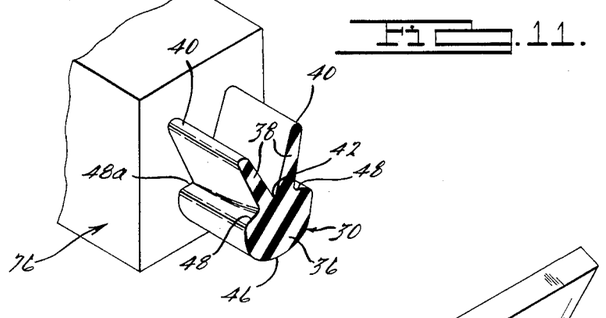
FIG. 11 is a diagrammatic view schematically illustrating one method of forming the sealing member of FIG. 4, wherein the sealing member is extruded from an extrusion die.

The sealing member 30 can be fabricated by an extrusion process, as illustrated diagrammatically in FIG. 11. Because of the nature of the preferred expandable foam material, the opening in the extrusion head 76 shown in FIG. 11 typically differs slightly in size and configuration from that of the post-extrusion sealing member 30. Accordingly, as illustrated in FIG. 11, the generally flat portions 48a of the sealing member 30 immediately adjacent the opening in the extrusion die 76 may be oriented in a slightly different angular relationship with respect to the above-mentioned symmetry plane 52 shown in FIG. 4, when compared to the angular orientation of the flat portions 48 on the sealing member after the above-mentioned small amount of post-extrusion expansion has occurred. Similarly, the shapes, configurations, and orientations of other portions of the sealing member 30 may also differ slightly from those of such portions when the sealing member 30 leaves the extrusion die 76. Those skilled in the extrusion art, however, will readily recognize that such slight post-extrusion expansion frequently occurs with elastomeric materials and will thus size and configure the extrusion die opening accordingly.

Figures 12, 13, 14:
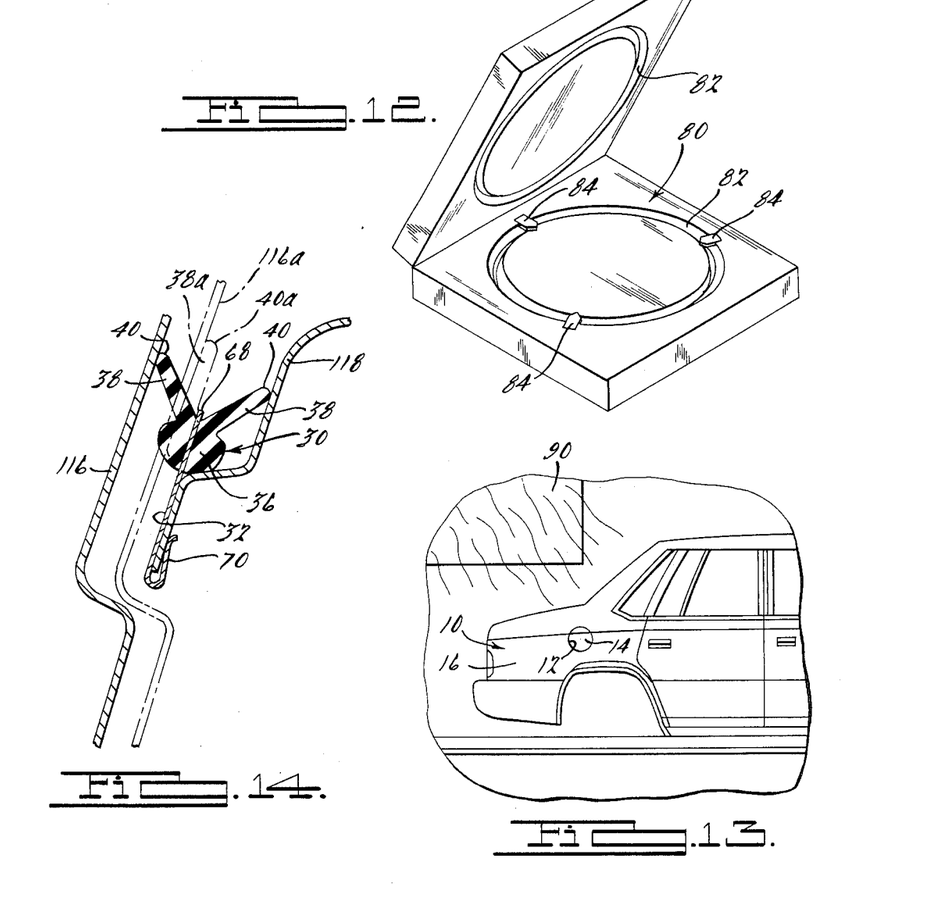
FIG. 12 is a diagrammatic view schematically illustrating another method for forming the sealing member of FIG. 4, wherein the sealing member is formed in an injection molding or other molding apparatus, with the clip member of FIGS. 6 through 9 integrally molded into the sealing member.
FIG. 13 diagrammatically illustrates the application of heat for activating the expandable foam material, of which a sealing member according to the present invention is preferably composed, in order to cause the sealing member to expand to its final configuration after being installed in a vehicle body assembly.
FIG. 14 is a cross-sectional view similar to that of FIG. 2, but illustrating a sealing member according to the present invention in its installed, but pre-heated, configuration, and also illustrating the capability of a sealing member according to the present invention to accommodate variations in spacings between the inner and outer vehicle body panels.

As an alternate to the extrusion forming of the sealing member 30 diagrammatically illustrated in FIG. 11, the sealing member 30 can also be injection molded, reaction injection molded, or otherwise molded according to various techniques known in the art, as illustrated in FIG. 12. In such a molding process, the above-discussed clip members 32, if needed, can be integrally molded in place rather than inserted after the forming of the sealing member 30. Such a technique is diagrammatically illustrated in FIG. 12, wherein a mold apparatus 80 includes appropriately shaped recesses 82 for molding the sealing member 30, as well as appropriately shaped and placed recesses 84 for pre-molding placement of th clip members 32 in order to allow the clip members 32 to be intgrally molded into the sealing member 30. Such molding techniques for forming the sealing member 30 offer certain advantages over the previously-discussed extrusion techniques, in that the possibility of adverse effects on the integrity of the sealing member 30 resulting from post-forming insertion of the clip members 32 into the sealing member 30 is avoided. In addition, the above discussed molding techniques for forming the sealing member 30 also eliminate the need for stapling, or otherwise fastening the ends of an extruded sealing member 30 to one another in order to retain the sealing member 30 in a generally ring-like or otherwise generally surrounding configuration for the fuel filler application illustrated in FIGS. 1 through 10.

Once the sealing member 30 has been formed by any of the techniques described above, and properly positioned between the assembled outer and inner body panels 16 and 18, respectively, on the vehicle body 10, the vehicle body 10 is then subjectd to heat in order to activate the preferred expandable foam material of the sealing member 30. This process is diagrammatically illustrated in FIG. 13, wherein the vehicle body 10 is placed adjacent a heating element, schematically illustrated by reference numeral 90.

The above-discussed heating process can frequently be accomplished during a normal coating or painting procedure used in typical automotive production. In such a process, the vehicle body 10 is typically dipped in a coating or paint formulation, subjected to an electrical charging process in order to adhere the coating or paint to the vehicle body 10, and then baked in order to cure the coating or paint. Thus, the heat-activated expandable foam material of the sealing member 30 is allowed to expand into its final configuration shown in FIG. 2 during the above-mentioned baking and curing step in the vehicle body manufacturing process.

FIG. 14 illustrates another advantage of the sealing member 30 according to the present invention, wherein the sealing member 30 is shown in its pre-heating configuration between an inner panel 118 and an outer panel 116, with the outer edge or end portions 40 of the flange portions 30 resiliently engaging the respective inner and outer panels 118 and 116. Because the build variations or tolerances in the spacing between the panels 116 and 118 can vary relatively widely in certain applications of the sealing member 30, the flange portions 38 are resiliently deflectable in order to accommodate such variations or tolerances, while still maintaining the engagement of their end or edge portions 40 with the respective panels 116 and 118. In addition, the preferred sealing member 30 according to the present invention is also particularly advantageous, both in terms of convenience and cost considerations, in that the resiliently deflectable flange portions 38 can also accommodate variations in the spacing between different sets of adjacent panels, in different applications, as illustrated in FIG. 14 by the phantom representation of the flange portion 38a, with its end or edge portion 40a engaging an alternate panel 116a.

Such adaptability is especially advantageous in the automotive application discussed, in that the same size, shape, and configuration of the sealing member 30 is usable in sealing applications for different vehicle configurations, as well as for different sealing applications within one particular vehicle configuration. Thus, the wide adaptability of the preferred sealing member 30 offers great flexibility and economy in the design of the various configurations for various panels, as well as reducing costs as a result of eliminating the need for a large number of different sizes, shapes, or configurations of the sealing member 30.

The foregoing discussion discloses and describes exemplary embodiments of the present invention. One skilled in the art will readily recognize from such discussion, and from the accompanying drawings and claims, that various changes, modifications, and variations may be made therein without departing from the spirit and scope of the invention as defined in the following claims.

I claim:

1. An elongated elastomeric sealing member for sealing between a pair of adjacent spaced-apart panels, said sealing member comprising an elongated inner bead portion, and a pair of elongated flange portions extending in generally outward lateral directions from said bead portion, said flange portions being disposed at a laterally angular relationship of less than 180 degrees with respect to one another in lateral cross-section with their respective outer ends each being engageable with the spaced-apart panels, said bead portion having a generally convex arcuate inner surface and a pair of generally flat outer surfaces, said flat outer surfaces being disposed on opposite lateral sides of said arcuate inner surface between said arcuate inner surface and an adjacent one of said flange portions, said sealing member being composed of a heat-activated expandable foam material in order to expand to sealingly fill a portion of the space between the spaced-apart panels upon the application of sufficient heat to activate said expansion after said sealing member has been disposed between the panels.

2. A sealing member according to claim 1, wherein said flange portions are disposed at an acute angular relationship with one another in lateral cross-section.

3. A sealing member according to claim 1, wherein said flange portions intersect one another at a laterally outer position on said bead portion between said generally flat outer surface of said bead portion.

4. A sealing member according to claim 1, wherein said sealing member is substantially symmetrical in lateral cross-section about an elongated symmetry plane extending outwardly from said arcuate inner surface through the longitudinal centerline of said bead portion, said flange portions being disposed at generally equal acute angles relative to opposite sides of said symmetry plane, and said generally flat outer surfaces of said bead portion extending in directions transverse to said symmetry plane and transverse to their respective adjacent flange portions.

5. A sealing member according to claim 4, wherein said generally flat outer surfaces of said bead portion extend in a generally outwardly sloping lateral direction from said arcuate inner surface of said bead portion to intersect with their respective adjacent flange portions on opposite sides of said symmetry plane.

6. A sealing member according to claim 1, wherein each of said generally flat outer surfaces of said bead portion intersects its adjacent flange portion at an angular relationship of approximately 80 degrees to approximately 100 degrees therewith.

7. A sealing member according to claim 1, wherein each of said generally flat outer surfaces of said bead portion intersects its adjacent flange portion at an angular relationship of approximately 90 degrees therewith.

8. A sealing member according to claim 1, wherein said flange portions are disposed at an acute angular relationship with one another and at generally equal angles with respect to opposite sides of a longitudinal plane extending outwardly from said bead portion, said sealing member being adapted to be bent in a generally inward direction generally along said longitudinal plane in order to extend along a generally arcuate longitudinal path between the adjacent spaced-apart panels, said generally flat outer surfaces of said bead portion intersecting with their respective adjacent flange portions and extending transversely with respect to said longitudinal plane in order to facilitate said inward bending of said sealing member along said longitudinal plane.

9. A sealing member according to claim 1, wherein said flange portions are disposed at an acute angular relationship with one another and are resiliently deflectable generally toward one another in order to resiliently engage the adjacent spaced-apart panels and to accommodate variations in the spacing of the spaced-apart panels.

10. A sealing member according to claim 9, wherein said sealing member is adapted to be bent in a generally inward direction generally along a longitudinal plane extending outwardly from said bead portion between said flange portions in order to position said sealing member to extend along a generally arcuate longitudinal path between the adjacent spaced-apart panels, said generally flat outer surfaces of said bead portion intersecting with their respective adjacent flange portions and extending transversely with respect to said longitudinal plane in order to facilitate said inward bending of said sealing member along said longitudinal plane.

11. A sealing member according to claim 10, wherein each of said generally flat outer surfaces of said bead portion intersects its adjacent flange portion at an angular relationship of approximately 80 degrees to approximately 100 degrees therewith.

12. In a vehicle body assembly having an opening therethrough, an inner body panel, an outer body panel adjacent to, but spaced apart from, the inner body panel in an area generally surrounding the opening, and an elongated sealing member generally surrounding the opening and disposed in sealing engagement between the spaced-apart inner and outer body panels, the improvement wherein said sealing member comprises an inner bead portion extending longitudinally throughout said sealing member, a pair of elongated flange portions integrally formed with said bead portion and extending in generally outward lateral directions from said inner bead portion, said flange portions being disposed at an angular relationship of less than 180 degrees with one another and at generally equal angles with respect to a longitudinal plane extending longitudinally throughout said sealing member and laterally outwardly from said bead portion, said bead portion having a convex arcuate inner surface and a pair of generally flat outer surfaces, said flat outer surfaces being disposed on opposite lateral sides of said arcuate inner surface between said arcuate inner surface and an adjacent one of said flange portions, said flat outer surfaces of said bead portion extending in lateral directions transverse to their respective adjacent flange portions and transverse to said longitudinal plane, said sealing member being composed of a heat-activated expandable foam material in order to expand to sealingly fill a portion of the space between the adjacent spaced apart body panels upon the application of sufficient heat to activate said expansion, said flange portions having outer ends spaced sufficiently apart from one another to engage the adjacent spaced-apart body panels prior to said application of heat in order to hold said sealing member in place therebetween prior to said application of heat, said flange members also being resiliently deflectable generally toward one anothre in order to resiliently engage said body panels prior to said heat activation and to accommodate variations in the spacing between the body panels prior to said application of heat.

13. The invention according to claim 12, wherein said sealing member further comprises a mounting clip engaging said bead portion at one end of said mounting clip and having clip means thereon for engaging one of the body panels in order to further secure said sealing member in place prior to said application of said heat, said engagement between said flange portions and the body panels tending to substantially prevent sagging of said sealing member in areas spaced away from said mounting clip prior to said application of heat.

14. The invention according to claim 13, wherein said one end of said clip has one or more barb portions thereon for securely engaging said bead portion of said sealing member, said clip means including a hooked portion generally at the opposite end of said mounting clip adapted to receive an edge portion of one of the body panels.

15. The invention according to claim 14, wherein said sealing member is formed by an extrusion process with the longitudinal ends of the extruded sealing member being secured together by a fastener, said barb portion of said mounting clip being forcibly inserted into said bead portion after said extrusion.

16. The invention according to claim 14, wherein said sealing member is formed by a molding process, said barb portion of said clip member being integrally molded in place in said bead portion.

17. The invention according to claim 14, wherein said clip member extends from said bead portion in a generally inward direction to said clip means, said clip means including a hooked inner portion of said mounting clip.

18. The invention according to claim 12, wherein said sealing member is adapted for sealing between the spaced-apart body panels in an area generally surrounding a fuel filler opening in said vehicle body assembly, said heat-activated expandable foam material of said sealing member comprising a compound including an ethyl vinyl acetate.

19. The invention according to claim 12, wherein said sealing member is adapted for sealing between spaced-apart inner and outer body panels in different vehicles having different spacing between said inner and outer body panels, said flange portions further being resiliently deflectable in order to accommodate said different spacing in said different vehicles.

20. The invention according to claim 12, wherein said sealing member includes a mounting protuberance extending from said inner bead portion generally opposite said flange portions, said mounting protuberance being adapted to be received in a mounting opening in said vehicle body assembly.

21. An elongated elastomeric sealing member for sealing between a pair of adjacent spaced-apart panels, said sealing member comprising an elongated inner bead portion, and a pair of elongated flange portions intersecting said bead portion and extending in generally outward lateral directions from said bead portion, said flange portions being disposed at a laterally angular relationship at their intersections with said bead portion of less than 180 degrees with respect to one another in lateral cross-section with their respective outer ends each being engageable with the spaced-apart panels, said bead portion having an inner surface and an outer surface, said flange portions extending generally laterally outwardly from said outer surface and being deflectable toward one another in order to engage the spaced-apart panels and to accommodate variations in the spacing of the spaced-apart panels when disposed therebetween, said sealing member being composed of a heat-activated expandable foam material in order to expand to sealingly fill a portion of the space between the spaced-apart panels upon the application of sufficient heat to activate said expansion after said sealing member has been disposed between the panels.

22. A sealing member according to claim 21, wherein said flange portions are disposed at an acute angular relationship with one another in lateral cross-section at their intersections with said bead portion.

23. A sealing member according to claim 21, wherein said flange portions are disposed at generally equal angles with respect to opposite sides of a longitudinal plane extending outwardly from said bead portion, said sealing member being adapted to be bent in a generally inward direction generally along said longitudinal plane in order to extend along a generally arcuate longitudinal path between the adjacent spaced-apart panels, said inner surface of said bead portion being generally flat and extending transversely with respect to said longitudinal plane in order to facilitate said inward bending of said sealing member along said longitudinal plane.

24. A sealing member according to claim 21, wherein said sealing membere is adapted to be bent in a generally inward direction generally along a longitudinal plane extending outwardly from said bead portion between said flange portions in order to position said sealing member to extend along a generally arcuate longitudinal path between the adjacent spaced-apart panels, said inner surface of said bead portion being generally flat and extending transversely with respect to said longitudinal plane in order to facilitate said inward bending of said sealing member along said longitudinal plane.

25. A sealing member according to claim 21, wherein said bead portion has at least one protuberance extending generally laterally therefrom, said protuberance being engageable with a discontinuity on one of said spaced-apart panels for retaining said sealing member between said spaced-apart panels prior to said application of heat.

26. A sealing member according to claim 25, wherein said discontinuity is an opening in one of said spaced-apart panels, said protuberance is adapted to be snapped into said opening.

27. A sealing member according to claim 21, wherein said flange portions are generally arcuate in lateral cross-section and divergingly curve laterally away from one another in said generally laterally outward direction.

28. In a vehicle body assembly having an opening therethrough, an inner body panel, an outer body panel adjacent to, but spaced apart from, the inner body panel in an area generally surrounding the opening, and an elongated sealing member generally surrounding the opening and disposed in sealing engagement between the spaced-apart inner and outer body panels, the improvement wherein said sealing member comprises an inner bead portion extending longitudinally throughout said sealing member, a pair of elongated flange portions intersecting and integrally formed with said bead portions and extending in generally outward lateral directions from said innre bead portion, said flange portions being disposed at an angular relationship at their intersections with said bead portion of less than 180 degrees with one another and at generally equal angles with respect to a longitudinal plane extending longitudinally throughout said sealing member and laterally outwardly from said bead portion, said bead portion having an inner surface and a generally flat outer surface, said flange portions extending generally laterally outwardly froms aid outer surface of said bead portion, said sealing member being adapted to be bent in a generally inward direction generally along said longitudinal plane in order to position said sealing member to extend along a generally arcuate longitudinal path between said spaced-apart panels, said inner surface of said bead portion being generally flat and extending transversely with respect to said longitudinal plane in order to facilitate said inward bending of said sealing member along said longitudinal plane, said sealing member being composed of a heat-activated expandable foam material in order to expand to sealingly fill a portion of the space between the spaced-apart body panels upon the application of sufficient heat to activate said expansion after said sealing member has been disposed between the panels, said flange portions having outer ends spaced sufficiently apart from one another to engage the adjacent spaced-apart body panels prior to said application of heat and being resiliently deflectable generally toward one another in order to resiliently engage said body panels prior to said heat activation and to accommodate variations in the spacing between the body panels prior to said application of heat.

29. The invention according to claim 28, wherein said bead portion has at least one protuberance extending generally laterally therefrom, said protuberance being engageable with a discontinuity on one of said spaced-apart panels for retaining said sealing member between said spaced-apart panels prior to said application of heat.

30. The invention according to claim 29, wherein said discontinuity is an opening in one of said spaced-apart panels, said protuberance is adapted to be snapped into said opening.

31. The invention according to claim 28, wherein said flange portions are generally arcuate in lateral cross-section and divergingly curve laterally away from one another in said generally laterally outward direction.

* * * * *

UNITED STATES PATENT AND TRADEMARK OFFICE
CERTIFICATE OF CORRECTION

PATENT NO. : 4,813,690

DATED : March 21, 1989

INVENTOR(S) : John A. Coburn, Jr.

It is certified that error appears in the above-identified patent and that said Letters Patent is hereby corrected as shown below:

Column 3, line 66, "engagesthe" should be --engages the--.

Column 4, line 37, "innr" should be --inner--.

Column 5, line 35, "lateraly" should be --laterally--.

Column 5, line 39, after "includes" insert --a--.

Column 5, line 53, "fianl" should be --final--.

Column 6, line 38, "th" should be --the--.

Column 6, line 40, "intgrally" should be --integrally--.

Column 7, line 28, "representation" should be --representations--.

Column 8, line 11, Claim 3, "surface" should be --surfaces--.

Column 9, line 44, Claim 12, "anothre" should be --another--.

Column 11, line 4, Claim 24, "membere" should be --member--.

Column 11, line 42, Claim 28, "innre" should be --inner--.

Column 12, line 6, Claim 28, "froms aid" should be --from said--.

Signed and Sealed this

Nineteenth Day of December, 1989

Attest:

JEFFREY M. SAMUELS

*Attesting Officer*   *Acting Commissioner of Patents and Trademarks*